W. D. VOGTS.
AUTOMOBILE PUMP ATTACHMENT.
APPLICATION FILED DEC. 2, 1918.
1,327,793.  
Patented Jan. 13, 1920.
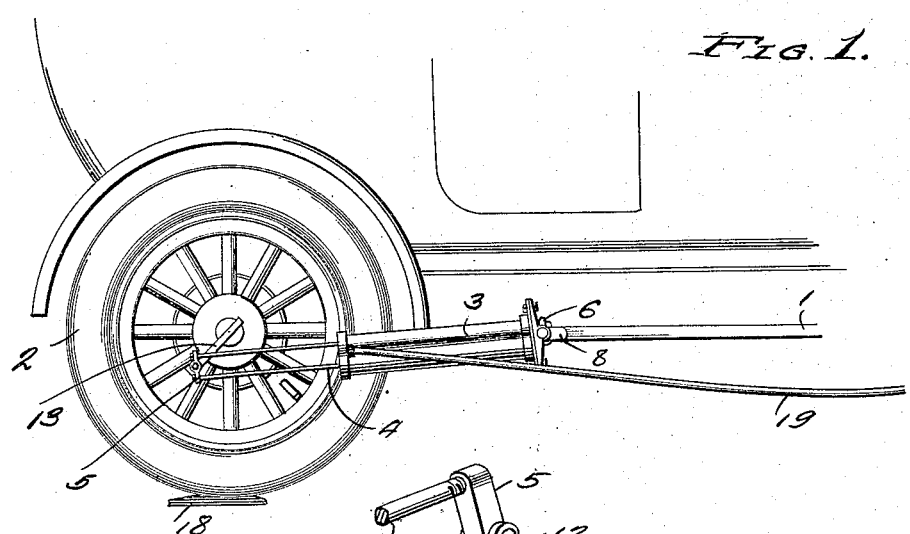
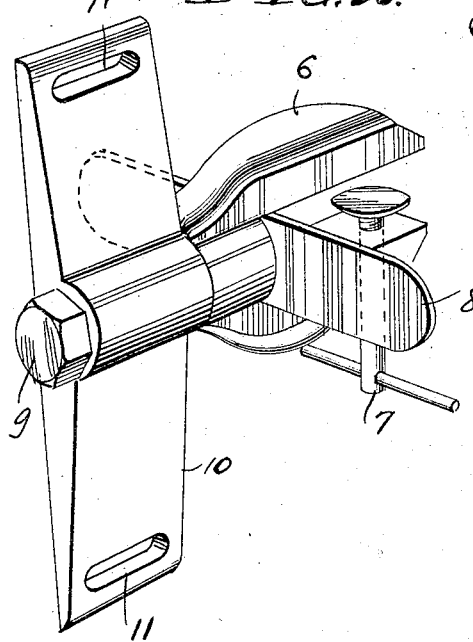
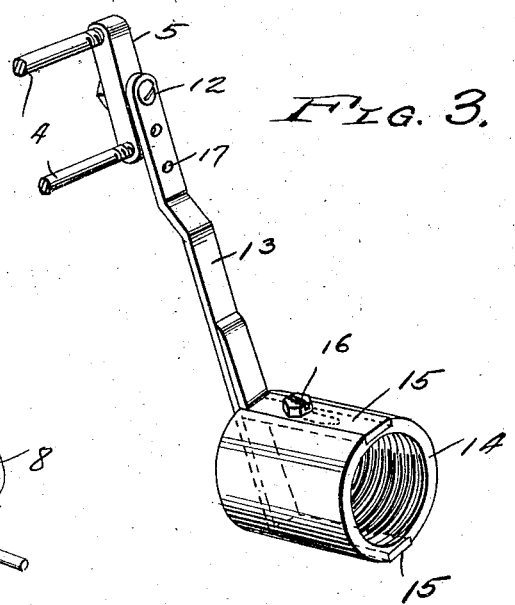

UNITED STATES PATENT OFFICE.

WALTER D. VOGTS, OF WAUNAKEE, WISCONSIN.

AUTOMOBILE PUMP ATTACHMENT.

1,327,793.   Specification of Letters Patent.   Patented Jan. 13, 1920.

Application filed December 2, 1918. Serial No. 265,034.

*To all whom it may concern:*

Be it known that I, WALTER D. VOGTS, a citizen of the United States, residing at Waunakee, in the county of Dane and State of Wisconsin, have invented certain new and useful Improvements in Automobile Pump Attachments, of which the following is a specification.

The invention provides novel means whereby a hand pump may be mechanically operated by the motor of an automobile or like mechanically propelled vehicle equipped with pneumatic tires, so that such tires may be inflated when required with ease and despatch and without requiring the effort incident to operating an air pump by hand.

The invention contemplates novel means for attaching the pump to a convenient part of the machine such as the running board and other means for connecting the piston rod to one of the drive wheels, thereby admitting of the pump being operated by the motor of the machine.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

Referring to the drawing,

Figure 1 is a view in elevation of a portion of an automobile equipped with a hand pump in accordance with the invention.

Fig. 2 is a detail perspective view of the means, whereby the pump is adapted to be attached to the running board of the vehicle.

Fig. 3 is a detail perspective view of the means for connecting the piston rod of the pump to one of the drive wheels.

Corresponding and like parts are referred to in the following description and indicated in the several views of the drawing by like reference characters.

Referring to Fig. 1 of the drawing the numeral 1 designates the running board of an automobile and 2 one of the rear drive wheels, said parts being of well known construction and arrangement. The numeral 3 designates a hand pump of the double acting type and is of any well known construction. The piston rods 4 are connected at their outer ends by means of a yoke 5.

The means for attaching the pump to the machine are shown most clearly in Fig. 2 and comprise a clamp 6 which is of well known construction so as to embrace the upper and lower sides of the running board 1 to which it is secured by the usual clamp screw 7 threaded into a jaw of the clamp 6. A stay 8 is disposed in line with the inner end of the space formed between the jaws of the clamp and projects upon opposite sides of the clamp a sufficient distance to obtain a bearing against the outer edge of the running board to prevent any possible oscillatory movement of the clamp when the pump is in operation. The stay 8 constitutes an integral part of the clamp. A journal 9 projects outwardly from the clamp and may be formed therewith or secured thereto in any manner. A member 10 is mounted upon the journal 9 to turn freely thereon and is provided at its ends with slots or openings 11 to receive suitable fastening means, whereby the base of the pump 3 is secured to the member 10. The slots or openings 11 extend transversely of the member 10 to admit of lateral adjustment of the clamp as may be found necessary in adapting the same to different makes of machines.

The yoke 5 consists of a short bar which is transversely apertured at a central point to receive a bolt or fastening 12 by means of which it is pivotally connected to an arm 13. The arm 13 is carried by a hub cap 14 which is adapted to replace the ordinary hub cap when the attachment is in position. Jaws 15 project laterally from the inner end of the arm 13 and embrace opposite sides of the hub cap 14 to which they are adjustably connected by bolts or fastening means 16. The outer sides of the hub cap 14 are grooved to form seats for receiving the jaws 15, thereby enabling a single fastening being successfully used for attaching each of the jaws to the hub cap. The stroke of the pistons of the pump may be varied by adjustably connecting the yoke 5 with the arm 13 and for this purpose the arm 13 is provided with a plurality of openings 17 in its length to receive the fastening 12.

When it is required to operate a hand pump by the motor of an automobile the pump is secured to the running board or other convenient part of the machine by the means substantially as shown in Fig. 2. The ordinary hub cap is removed and replaced by the hub cap 14 after which the yoke 5 is pivotally connected to the arm 13 by the fastening 12. The rear wheel is elevated by means of a jack 18. The tube 19 leading from the pump is coupled to the tire to be inflated after which the motor of the vehicle is started which results in driving the wheel elevated by means of the jack 18, thereby operating the pump and inflating the tire. It will be understood that the pump is adapted to be quickly and easily placed in position and again removed when not required for immediate service, thereby enabling the work to be performed by the motor of the vehicle and obviating the labor incident by operating a pump by hand.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

In a pump attachment of the character specified, the combination of a hub cap having longitudinal seats at opposite sides, an arm having jaws projecting laterally therefrom and embracing the sides of the hub cap and fitted in the seats thereof, and means for securing said jaws to the hub cap in the required adjusted position.

In testimony whereof I affix my signature in presence of two witnesses.

WALTER D. VOGTS.

Witnesses:
 WILLIAM VOGTS,
 CHR. VOGTS.